United States Patent
Rowitch (10) Patent No.: US 7,292,188 B2
(45) Date of Patent: Nov. 6, 2007

(54) APPARATUS AND METHOD FOR CDMA TIME PSEUDOLITE FOR REPEATER IDENTIFICATION

(75) Inventor: Douglas N. Rowitch, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 10/955,274

(22) Filed: Sep. 29, 2004

(65) Prior Publication Data

US 2006/0071855 A1 Apr. 6, 2006

(51) Int. Cl.
*G01S 3/02* (2006.01)
*G01S 1/08* (2006.01)

(52) U.S. Cl. ..................... 342/464; 342/386
(58) Field of Classification Search .......... 342/357.04, 342/357.06, 357.1, 357.14, 386, 463–464; 455/456.1, 456.6
See application file for complete search history.

(56) References Cited

U.S. PATENT DOCUMENTS

| 6,188,354 | B1 | 2/2001 | Soliman et al. |
| 6,961,367 | B2* | 11/2005 | Simic et al. ............. 455/456.1 |
| 2002/0115448 | A1* | 8/2002 | Amerga et al. .......... 455/456.5 |
| 2003/0207681 | A1 | 11/2003 | Rowitch |
| 2004/0165657 | A1 | 8/2004 | Simic et al. |
| 2004/0166873 | A1* | 8/2004 | Simic et al. ............. 455/456.1 |

FOREIGN PATENT DOCUMENTS

WO 2004011956 A2 2/2004

\* cited by examiner

*Primary Examiner*—Thomas H. Tarcza
*Assistant Examiner*—Fred H. Mull
(74) *Attorney, Agent, or Firm*—Thomas Rouse; Bruce Greenhaus; Linda Gunderson (57) ABSTRACT

Apparatus and method for resolving repeater location ambiguities in a CDMA network using a CDMA Time Pseudolite. The CDMA Time Pseudolite includes a CDMA receiver to receive a CDMA signal with an embedded CDMA timing, a baseband processor to extract the CDMA timing and to adjust the CDMA timing to derive a signal with GNSS-like timing; and a GNSS transmitter to generate a GNSS-like signal and to transmit the GNSS-like signal to a mobile station. In one embodiment, the CDMA Time Pseudolite is situated at or nearby a CDMA signal repeater so that a mobile station may unambiguously identify a received CDMA signal as being transmitted by a particular CDMA signal repeater and then using that received CDMA signal for position determination of the mobile station.

28 Claims, 6 Drawing Sheets

APPARATUS AND METHOD FOR CDMA TIME PSEUDOLITE FOR REPEATER IDENTIFICATION

BACKGROUND

1. Field

The field of the present invention relates generally to wireless communications and position location. More particularly, the present invention relates to apparatus and methods for position determination of wireless, mobile devices using both satellite-based positioning signals and terrestrial-based positioning signals.

2. Background

Position location has become significantly easier and more accurate since the development of positioning satellite systems. These positioning satellite systems are generally known as Global Navigational Satellite Systems (GNSS). One example of a system of positioning satellites is the U.S. NAVSTAR Global Positioning System (GPS). Another example is the GLONASS System maintained by the Russian Republic. Other positioning satellite systems being planned include the European GALILEO system. GNSS receivers are currently available for use in aircraft, ships, ground vehicles and hand-held devices for determining position location.

The various systems use multiple satellites (e.g., NAVSTAR GPS employs thirty-two satellites with twenty-four active) that orbit the earth in multiple orbital planes (e.g., NAVSTAR GPS satellites are in six orbital planes). The satellites repeat almost the same ground track as the earth turns beneath them each day. The orbital planes are equally spaced and inclined with respect to the equatorial plane, thus ensuring that a line-of-sight path exists to at least five satellites from any unobstructed point on the earth at all times.

Each satellite carries a highly accurate atomic clock that is synchronized to a common time base (GNSS time). Ground-based monitor stations measure signals from the satellites and incorporate these measurements into orbital and clock models for each satellite. Navigation data and satellite clock corrections are computed for each satellite from these models and are uploaded to each satellite. The satellite then transmits a navigation message that includes information relating to its position and its clock correction parameters.

An autonomous GNSS receiver calculates its position by combining data from the navigation message (which indicates the position of the satellite) with the measured delay of the signal received from the satellite (which indicates the position of the receiver relative to the satellite). Because of offsets in the receiver's time base relative to the GNSS time base, signals from at least four satellites are typically required to resolve a position in three dimensions and the time offset.

Problems in GNSS signal detection may occur when a GNSS receiver cannot receive a line-of-sight signal from a sufficient number of satellites. In obstructed environments (e.g., indoors, underground, obstructed locations, etc.), it may not be possible for a GNSS receiver to receive adequate (in quantity and quality) signals to make an accurate position determination.

A conventional pseudolite is a stationary terrestrial transmitter that receives one or more GNSS signals and generates and transmits a digitally coded waveform at a GNSS carrier frequency to augment the GNSS position solution. In the NAVSTAR GPS system, PRN binary sequences 33 through 37 are not assigned to satellites and may be used by a conventional pseudolite to generate and transmit a coarse acquisition (C/A) waveform. If the timing and position of a conventional pseudolite are known with high precision, then its transmitted digitally coded waveform may be used to make a position determination along with other GNSS waveforms. Thus, conventional pseudolites may be used to augment GNSS coverage.

Figure 1:
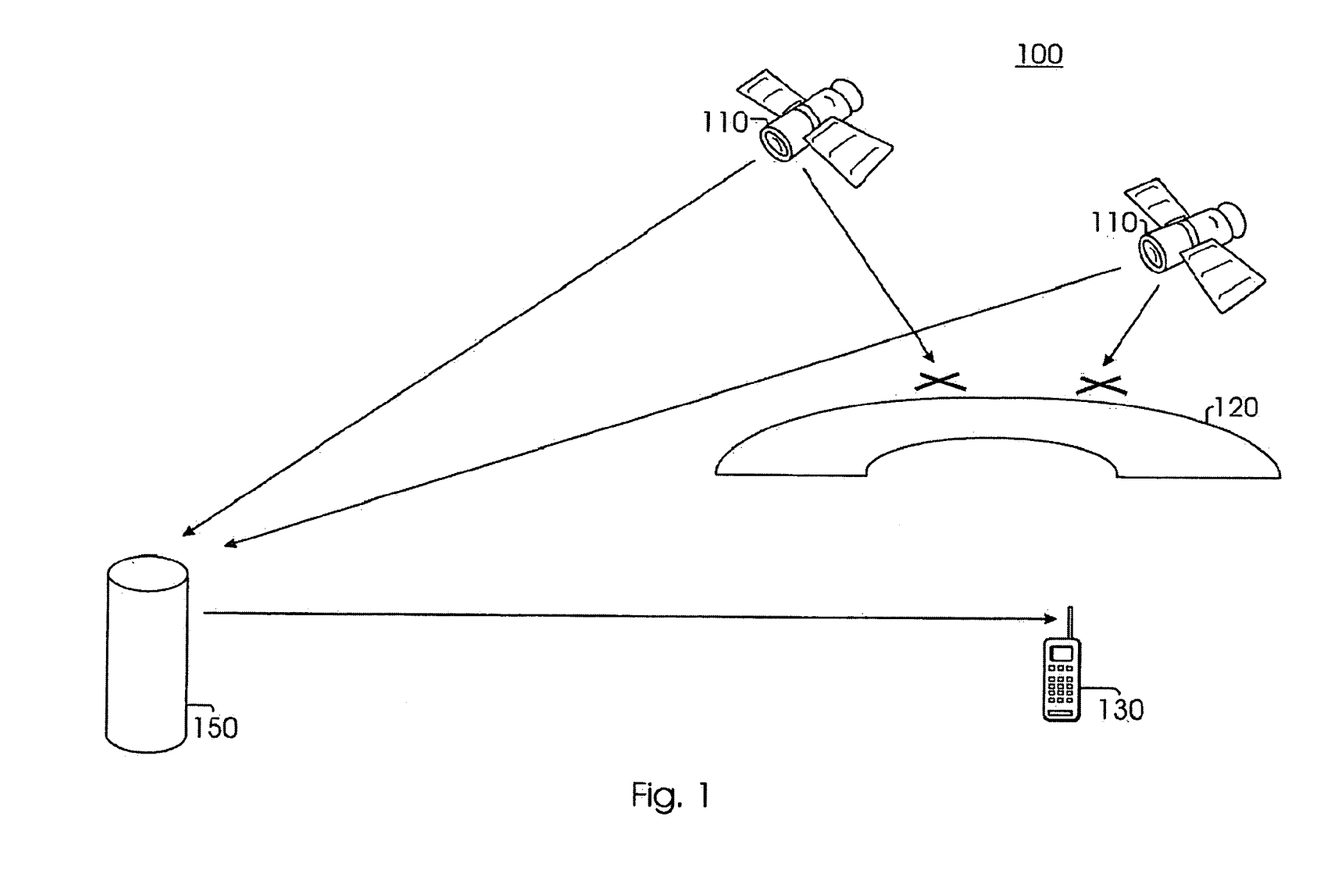
FIG. 1 illustrates a position determination system using a conventional pseudolite to augment GNSS coverage.

FIG. 1 illustrates a position determination system 100 using a conventional pseudolite 150 to augment GNSS coverage. GNSS satellites 110 provide reference signals to mobile station 130 for position determination. The line of sight between one or more GNSS satellites 110 and the mobile station 130 may be blocked or impaired by obstruction 120 depending on the instantaneous locations of both the GNSS satellites 110 and the mobile station 130. An obstruction 120 may include, but is not limited to, an indoor environment, a bridge, a building, topographical features such as mountains or canyons, etc. With a line of sight blocked or impaired, the mobile station 130 may not receive the required GNSS reference signals from the GNSS satellites 110 for position determination. To overcome the obstruction problem, one typical solution uses a conventional pseudolite 150 to transmit a reference signal to the mobile station 130. The transmitted reference signal is synchronized by the conventional pseudolite 150 to GNSS timing. Conventional pseudolite 150 is a terrestrially based transmitter to augment the GNSS satellites 110. Another typical solution uses a conventional pseudolite 150 to relay at least one reference signal from the GNSS satellites 110 to mobile station 130. However, conventional pseudolites require a line-of-sight signal from one or more GNSS satellites and are useful only where a GNSS signal is available. In some cases, the line of sight between a conventional pseudolite 150 and the GNSS satellites 110 is also obstructed, thus compromising the ability of the conventional pseudolite 150 to augment the GNSS satellites 110. Additionally, a mobile station 130 may be in an underground environment, such as a subway, a basement of a building, a tunnel, etc., where reference signals from conventional pseudolite 150 cannot penetrate or is heavily impaired. In such a case (absent a long cable run from the underground environment to a surface based GNSS receiving antenna), the ability of the conventional pseudolite 150 to substitute for the GNSS satellites 110 for the mobile station 130 is degraded.

In environments where GNSS coverage is difficult, CDMA mobile system coverage may be possible. Processing of the CDMA pilot phase measurements by the mobile station may yield its position if the locations of the CDMA source signals are known. However, when repeaters are used to re-transmit the CDMA signals, this introduces ambiguities in the locations of the CDMA source signals which results in unusable CDMA pilot phase measurements for mobile station position determination. If the CDMA signals could be unambiguously identified as transmitted from particular repeaters from particular locations, then these repeated CDMA signals could be used advantageously for mobile station position determination. Accordingly, it would be desirable to provide methods and apparatus for using a CDMA Time Pseudolite to identify repeated CDMA signals unambiguously so that they may be used for position determination of a mobile station.

SUMMARY

The present invention provides apparatus and methods for using a CDMA Time Pseudolite (CTP) to identify repeated CDMA signals for usage in the position determination of a mobile station. A CTP is a pseudolite which transmits a GNSS waveform but derives its timing from a CDMA signal.

According to one aspect, a CDMA system for mobile station position determination includes a CDMA Base Station to transmit an unrepeated CDMA pilot signal, a repeater to receive the unrepeated CDMA pilot signal and to transmit a repeated CDMA pilot signal, a CTP situated adjacent to or nearby the repeater whereby the CTP transmits a GNSS-like signal, and a mobile station to receive the repeated CDMA pilot signal and the GNSS-like signal. In one embodiment, the GNSS-like signal is used for repeater identification.

In another aspect, the CDMA system for mobile station position determination includes a first CDMA Base Station to transmit an unrepeated CDMA pilot signal, a repeater to receive the unrepeated CDMA pilot signal and to transmit a repeated CDMA pilot signal, a CTP situated adjacent to or nearby the repeater whereby the CTP transmits a GNSS-like signal, a second CDMA Base Station to transmit a CDMA pilot signal, and a mobile station to receive the repeated CDMA pilot signal, the CDMA pilot signal and the GNSS-like signal. In one embodiment, the GNSS-like signal is used for repeater identification. In another embodiment, the CDMA pilot signal and the repeated CDMA pilot signal are used to determine the position of the mobile station.

According to one aspect, a method for mobile station position determination includes the following steps: receiving a repeated CDMA pilot signal, receiving a GNSS-like signal, using the GNSS-like signal to identify the repeater, and determining the position of a mobile station using the repeated CDMA pilot signal.

According to another aspect, a method for mobile station position determination includes the following steps: receiving a repeated CDMA pilot signal, receiving a GNSS-like signal, receiving a GNSS signal, using the GNSS-like signal to determine repeater identification, and determining the position of a mobile station using the repeated CDMA pilot signal and the GNSS signal.

It is understood that other embodiments will become readily apparent to those skilled in the art from the following detailed description, wherein it is shown and described various embodiments by way of illustration. The drawings and detailed description are to be regarded as illustrative in nature and not as restrictive.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. In addition, for the purposes of this disclosure, the term "coupled" means "connected to" and such connection can either be direct or, where appropriate in the context, can be indirect, e.g., through intervening or intermediary devices or other means.

Figure 2:
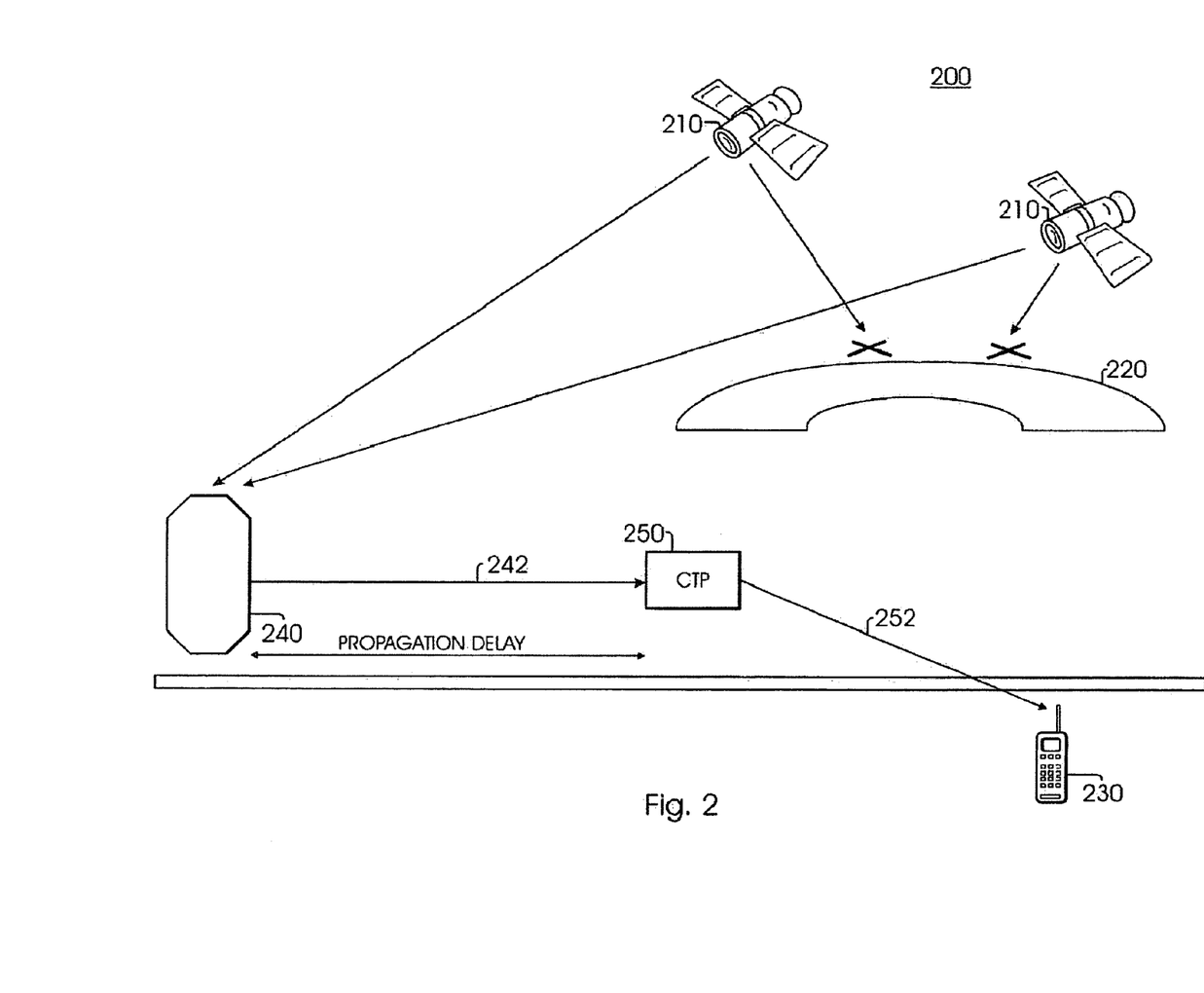
FIG. 2 illustrates a position determination system using CDMA Time Pseudolite (CTP) to augment GNSS coverage.

FIG. 2 illustrates a position determination system 200 using CDMA Time Pseudolite (CTP) 250 to augment GNSS coverage. GNSS satellites 210 provide reference signals to mobile station 230 for position determination. The line of sight between one or more GNSS satellites 210 and the mobile station 230 may be blocked or impaired by obstruction 220 depending on the instantaneous locations of both the GNSS satellites 210 and the mobile station 230. A CDMA Time Pseudolite (CTP) 250 can be used to solve the problems experienced by conventional pseudolite 150. First, CDMA signal 242 (generated by a CDMA base station 240 and including an unrepeated CDMA pilot signal 445) typically has higher signal strength relative to GNSS satellite signals. Second, the CDMA timing associated with CDMA signal 242 is approximately synchronized to GNSS timing, and therefore the CDMA timing may be used as a surrogate for GNSS timing. The CDMA timing is embedded in the CDMA signal 242 which is transmitted to the input of the CTP 250. (See FIG. 3.) In one embodiment, the CDMA base station 240 receives its timing directly from GNSS satellites 210. In another embodiment, the timing of the CDMA base station 240 is received indirectly from GNSS satellites 210 via some intermediate path(s) known to one skilled in the art (e.g., a terrestrial clock slaved to GNSS time). An example of a synchronous CDMA base station, where each base station is approximately synchronized to GNSS timing, is a CDMA2000 base station.

Another type of CDMA base station is an asynchronous CDMA base station such as a WCDMA base station, where each base station has independent timing and is asynchronous to GNSS. In this case, a CTP 250 can still be used to solve the problems experienced by conventional pseudolite 150, as in the synchronous CDMA base station, except that there the CDMA timing associated with the CDMA signal is not synchronized to GNSS timing. The various timing offsets from each asynchronous base station may be aligned to a common GNSS reference time via further timing calibration known to one skilled in the art.

Figure 3:
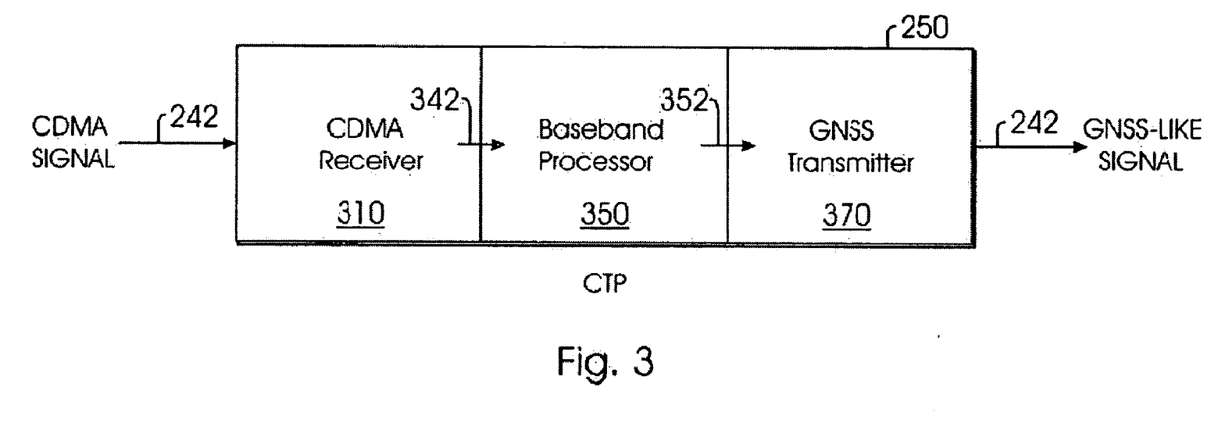
FIG. 3 is a functional diagram of a CTP of FIG. 2.

CTP 250 receives CDMA signal 242 and extracts the CDMA timing for use in generating a GNSS-like signal 252 as illustrated in FIG. 3. To a GNSS receiver, GNSS-like signal 252 appears identical to a real GNSS signal (using the same digitally coded carrier and waveform parameters), but there are distinctions such as: (1) the GNSS-like signal 252 is transmitted by a ground based transmitter instead of a real satellite; (2) since the ground based transmitter most likely will not use an atomic clock to provide clock corrections, its timing will be inherently less accurate than that of a GNSS satellite. FIG. 3 is a functional diagram of CTP 250. The CTP 250 has three functional portions, a CDMA receiver 310, a baseband processor 350 and a GNSS transmitter 370. The CDMA receiver 310 receives the CDMA signal 242 with embedded CDMA timing and downconverts the receive frequency band of the CDMA signal 242 to baseband, generating a receive baseband signal 342. The baseband processor 350 can be artificially viewed as having two parts—a receiving portion and a transmitting portion. The baseband processor 350 extracts the embedded CDMA timing from the receive baseband signal 342 in its receiving portion. In its transmitting portion, the baseband processor 350 adjusts the CDMA timing to create a GNSS-like timing, and uses the GNSS-like timing to derive a transmit baseband signal 352 (e.g., a signal with GNSS-like timing).

The CDMA timing is delayed relative to the CDMA base station timing due to the propagation distance between the CDMA base station 240 and the CTP 250. Since both the CDMA base station 240 and the CTP 250 are at fixed and known locations, the delay may be calibrated. In some instances, the delay may include other corrections such as (a) Base station calibration (the BS signal is not perfectly aligned with GNSS time), (b) CDMA receive chain group delay in the CTP, and (c) GNSS transmit chain group delay in the CTP. The CDMA timing is adjusted based on the calibrated delay to obtain GNSS-like timing. The GNSS transmitter 370 upconverts the baseband frequency band of the transmit baseband signal 352 to the GNSS transmit band, and transmits the GNSS-like signal 252.

Figure 4:
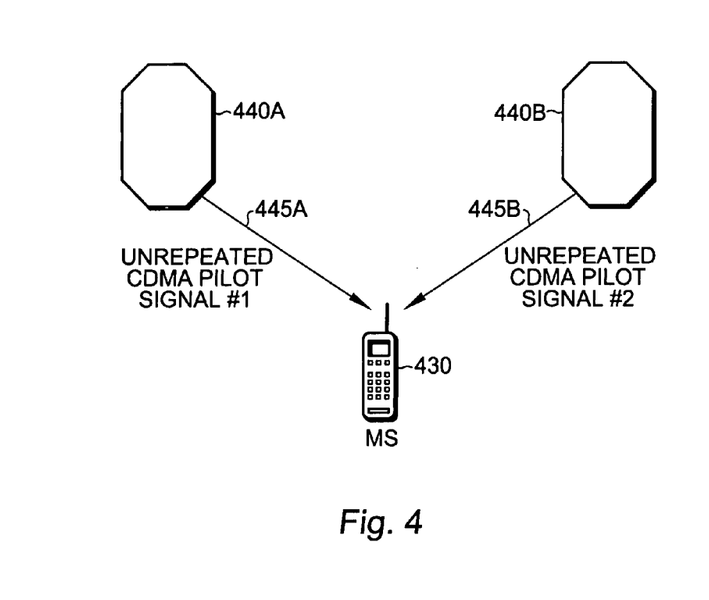
FIG. 4 illustrates a CDMA system for mobile station position determination using CDMA pilot phase measurements independent of GNSS.

FIG. 4 illustrates a CDMA system for mobile station position determination using CDMA pilot phase measurements independent of GNSS. In many cases, GNSS signals may be obstructed (e.g., underground, indoors, etc.) and cannot be used for position determination by a mobile station. As an alternative, CDMA pilot signals may be used for position determination. A CDMA Base Station 440 (CDMA BS) transmits an unrepeated CDMA pilot signal 445 to a mobile station 430. This unrepeated CDMA pilot signal 445 is used (in conjunction with other signals) for position determination of the mobile station 430. FIG. 4 shows two CDMA Base Stations 440a, 440b, each transmitting an unrepeated CDMA pilot signal 445a, 445b to mobile station 430. In some cases, multiple unrepeated CDMA pilot signals 445 from multiple CDMA Base Stations 440 (beyond the two shown in FIG. 4) are used. In other cases, combinations of unrepeated CDMA pilot signals 445 from CDMA Base Stations 440 and GNSS signals from GNSS satellites (not shown) are used for position determination.

Figure 5:
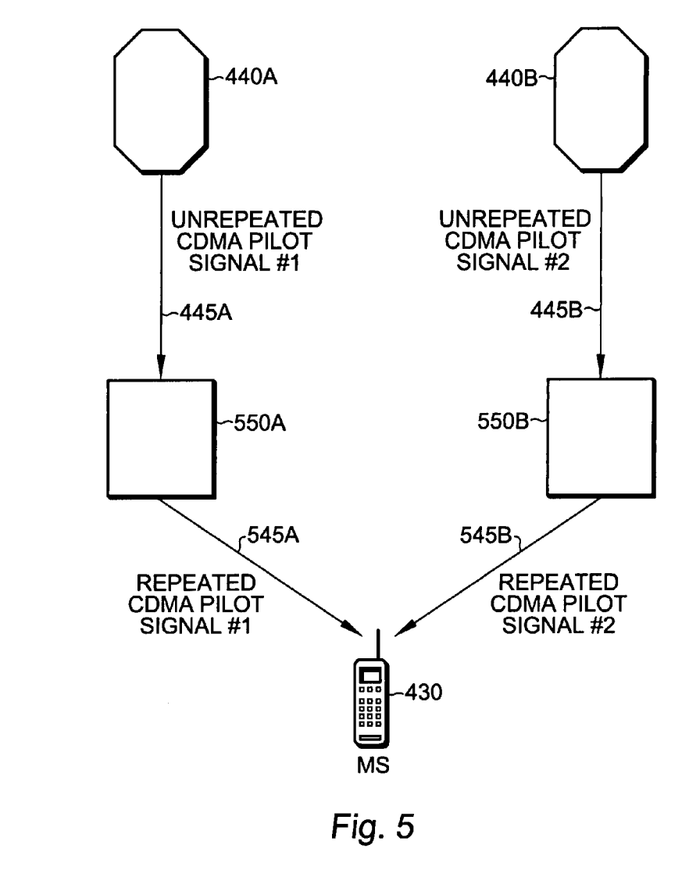
FIG. 5 illustrates a CDMA system for mobile station position determination with repeaters using CDMA pilot phase measurements independent of GNSS.

In many instances, a repeater 550 is added to amplify the unrepeated CDMA pilot signal 445. FIG. 5 illustrates a CDMA system for mobile station position determination with repeaters using CDMA pilot phase measurements independent of GNSS. The output of the repeater 550 is a repeated CDMA pilot signal 545 which is used (in conjunction with other signals) for position determination of the mobile station 430. A repeated CDMA pilot signal 545 is desirable to improve coverage for situations (e.g., underground, indoor, in a tunnel, at the edge of base station coverage area, etc.) where an unrepeated signal would be weak.

Since the repeater 550 retransmits a repeated version of the unrepeated CDMA pilot signal 445, it introduces an ambiguity in the timing of the repeated CDMA pilot signal 545 and an ambiguity in the transmitter location of the CDMA pilot signal. The repeated CDMA pilot signal 545 is no longer a direct line-of-sight signal from the CDMA Base Station 440. Without further information, the mobile station 430 cannot determine whether its received CDMA pilot signal is directly from the CDMA Base Station 440 or from a repeater 550. Without repeater identification, the received repeated CDMA pilot signal cannot be used for position determination of the mobile station 430. For repeater saturated environments (such as dense urban areas), most or all of the received repeated CDMA pilot signals without repeater identification are rendered unusable for position determination. In FIG. 5, each of the two CDMA Base Stations 440a, 440b transmits an unrepeated CDMA pilot signal 445a, 445b to separate repeaters 550a, 550b which each retransmits the repeated CDMA pilot signals 545a, 545b to mobile station 430. In some situations, multiple CDMA Base Stations and multiple repeaters 550 (beyond just two) may be used in parallel. Different CTPs use different spreading codes. The detection, by a mobile station, of a particular spreading code uniquely defines the CTP and therefore the associated CDMA repeater. If no CTP spreading codes are detected, then the CDMA signal is assumed to emanate from the parent base station. Although, it is not shown in FIG. 5, additional repeaters may be used in series along any one path from a CDMA Base Station 440 to a repeater 550.

Figure 6:
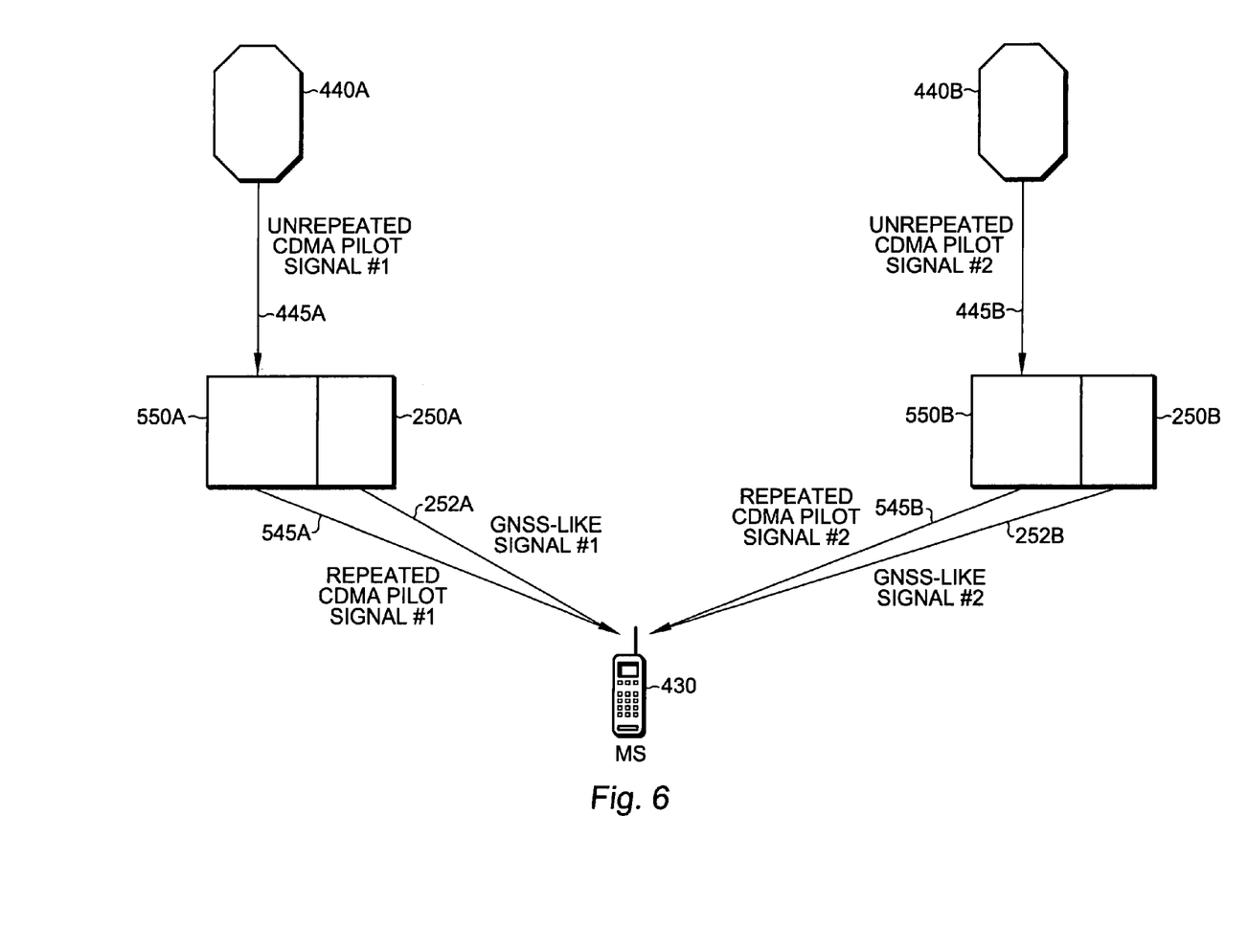
FIG. 6 illustrates a CDMA system for mobile station position determination with repeaters and CTPs to provide repeater identification using CDMA pilot phase measurements independent of GNSS.

FIG. 6 illustrates a CDMA system for mobile station position determination with repeaters and CTPs to provide repeater identification using CDMA pilot phase measurements independent of GNSS. To provide repeater identification, a CTP 250 is situated adjacent to or nearby a repeater 550. The CTP 250 transmits a GNSS-like signal 252 to the mobile station 430. Upon receipt of both the repeated CDMA pilot signals 545 and the GNSS-like signal 252, the repeater is unambiguously identified by the GNSS-like signal 252 and its corresponding repeated CDMA pilot signals 545 may be used for position determination of the mobile station 430. In one embodiment, the GNSS-like signal 252 is used for both repeater identification and position determination of the mobile station 430.

In FIG. 6, each of the two CDMA Base Stations 440a, 440b transmits an unrepeated CDMA pilot signal 445a, 445b to separate repeaters 550a, 550b which each retransmits the repeated CDMA pilot signals 545a, 545b to mobile station 430. A CTP 250 is situated adjacent to or nearby each of the two repeaters 550a, 550b. It is understood by one skilled in the art that multiple CDMA Base Stations and multiple repeaters 550 (each with a CTP 250) may be used in parallel. Although, it is not shown in FIG. 6, one skilled in the art will understand that additional repeaters may be used in series along any one path from a CDMA Base Station 440 to a repeater 550.

Figure 7:
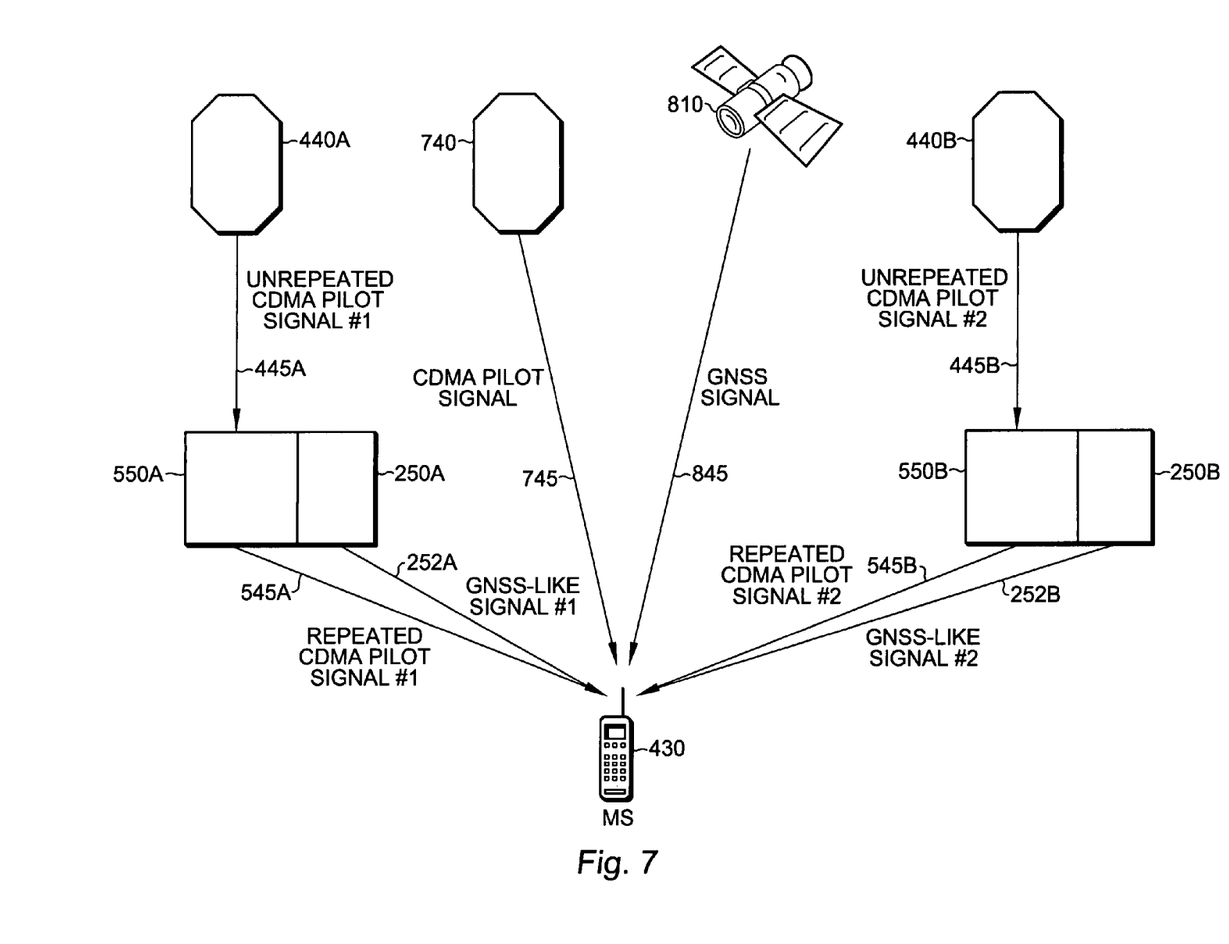
FIG. 7 illustrates a CDMA system for mobile station position determination via a combination of a) CDMA Base Stations transmitting repeated CDMA pilot signals and CTPs adjacent to repeaters to provide repeater identification, b) CDMA Base Stations (without repeaters and CTP) transmitting CDMA pilot signals, and/or c) GNSS satellites to provide GNSS signals.

In one embodiment, combinations of repeated CDMA pilot signals 545 from repeaters 550 (including GNSS-like signals 252a, 252b from adjacent or nearby CTPs 250) and GNSS signal(s) 845 from GNSS satellite(s) 810 (shown in FIG. 7) are used for position determination. In another embodiment, combinations of repeated CDMA pilot signals 545 from repeaters 550 (including GNSS-like signals 252*a*, 252*b* from adjacent or nearby CTPs 250), CDMA pilot signals 745 directly from a CDMA Base Station 740 (shown in FIG. 7) and GNSS signal(s) 845 from GNSS satellite(s) 810 (shown in FIG. 7) are used for position determination. Although only one GNSS satellite is shown in FIG. 7, it will be understood by one skilled in the art, that more than one GNSS satellites may be used. It will also be understood by one skilled in the art that multiple CDMA Base Stations and multiple repeaters 550 (each with a CTP 250) may be used in parallel. Although, it is not shown in FIG. 7, one skilled in the art will also understand that additional repeaters may be used in series along any one path from a CDMA Base Station 440 to a repeater 550.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention.

What is claimed is:

1. A CDMA system for determining a position of a mobile station comprising:
    a CDMA Base Station for transmitting an unrepeated CDMA pilot signal;
    a repeater for receiving the unrepeated CDMA pilot signal and for transmitting a repeated CDMA pilot signal to the mobile station;
    and a CDMA Time Pseudolite (CTP) situated adjacent to or nearby the repeater, the CTP transmitting a GNSS waveform signal to said mobile station.

2. The CDMA system of claim 1, wherein the GNSS waveform signal is used for repeater identification.

3. The CDMA system of claim 2 wherein the repeated CDMA pilot signal is used for determining the position of the mobile station.

4. The CDMA system of claim 1, wherein the repeated CDMA pilot signal is used for determining the position of the mobile station, and wherein the GNSS waveform signal uses the same coded carrier format as a GNSS signal transmitted by a satellite, but wherein the timing of the GNSS waveform signal is less accurate than the GNSS signal.

5. The CDMA system of claim 1, wherein the CTP comprises:
    a CDMA receiver for receiving the unrepeated CDMA pilot signal with embedded CDMA timing;
    a baseband processor for extracting the CDMA timing and adjusting the CDMA timing to derive a signal with GNSS-like timing; and
    a GNSS transmitter for upconverting the signal to the GNSS waveform signal and transmitting the GNSS waveform signal.

6. The CDMA system of claim 1, wherein the CDMA Base Station is synchronous to GNSS timing.

7. The CDMA system of claim 6, wherein the CDMA Base Station is a CDMA2000 Base Station.

8. The CDMA system of claim 6, wherein the CDMA Base Station is a WCDMA Base Station.

9. The CDMA system of claim 1, wherein the CDMA Base Station is asynchronous to GNSS timing.

10. A CDMA system for determining a position of a mobile station comprising:
    at least two CDMA Base Stations for transmitting at least two unrepeated CDMA pilot signals;
    at least two repeaters, each of the at least two repeaters receiving one of the at least two unrepeated CDMA pilot signal and transmitting one of at least two repeated CDMA pilot signals to the mobile station; and
    at least two CDMA Time Pseudolites (CTP) each of the at least two CTPs situated adjacent to or nearby one of the at least two repeaters and transmitting one of at least two GNSS waveform signals to the mobile station.

11. The CDMA system of claim 10, wherein the at least two GNSS waveform signals are used for repeater identification of each of the at least two repeaters.

12. The CDMA system of claim 11 wherein the at least two repeated CDMA pilot signals are used for determining the position of the mobile station.

13. The CDMA system of claim 10, wherein the at least two repeated CDMA pilot signals are used for determining the position of the mobile station.

14. The CDMA system of claim 10, wherein one of the at least two CTPs comprises:
    a CDMA receiver for receiving the unrepeated CDMA pilot signal with embedded CDMA timing;
    a baseband processor for extracting the CDMA timing and adjusting the CDMA timing to derive a signal with GNSS waveform timing; and
    a GNSS transmitter for upconverting the signal to the GNSS waveform signal and transmitting the GNSS waveform signal.

15. A CDMA system for determining a position of a mobile station comprising:
    a first CDMA Base Station for transmitting an unrepeated CDMA pilot signal;
    a repeater for receiving the unrepeated CDMA pilot signal and for transmitting a repeated CDMA pilot signal to the mobile station;
    a CDMA Time Pseudolite (CTP) situated adjacent to or nearby the repeater, the CTP transmitting a GNSS waveform signal to the mobile station; and
    a second CDMA Base Station for transmitting a CDMA pilot signal to the mobile station.

16. The CDMA system of claim 15, wherein the GNSS waveform signal is used for repeater identification.

17. The CDMA system of claim 16, wherein the CDMA pilot signal and the repeated CDMA pilot signal are used for determining the position of the mobile station.

18. The CDMA system of claim 15, wherein the CDMA pilot signal and the repeated CDMA pilot signal are used for determining the position of the mobile station.

19. A method for mobile station position determination comprising:
    receiving a repeated CDMA pilot signal;
    receiving a GNSS waveform signal generated by a non-satellite transmitter;
    using the GNSS waveform signal to determine repeater identification; and
    determining position of a mobile station using the repeated CDMA pilot signal.

20. The method of claim 19 further comprising the steps of receiving an unrepeated CDMA pilot signal and converting the unrepeated CDMA pilot signal to the repeated CDMA pilot signal.

21. The method of claim 20 further comprising the step of transmitting the unrepeated CDMA pilot signal to a repeater.

22. A method for mobile station position determination comprising:

receiving a repeated CDMA pilot signal;

receiving a GNSS waveform signal generated by a non-satellite transmitter;

receiving a GNSS signal generated by a satellite transmitter;

using the GNSS waveform signal to determine repeater identification; and determining position of a mobile station using the repeated CDMA pilot signal and the GNSS signal.

23. The method of claim 22 further comprising the steps of receiving an unrepeated CDMA pilot signal and converting the unrepeated CDMA pilot signal to the repeated CDMA pilot signal.

24. The method of claim 23 further comprising the step of transmitting the unrepeated CDMA pilot signal to a repeater.

25. Computer readable media embodying a program of instructions executable by a computer program to perform a method for mobile station position determination, the method comprising:

receiving a repeated CDMA pilot signal;

receiving a GNSS waveform signal generated by a non-satellite transmitter;

using the GNSS waveform signal to determine repeater identification; and determining position of a mobile station using the repeated CDMA pilot signal.

26. The computer readable media of claim 25 wherein the method further comprising receiving an unrepeated CDMA pilot signal and converting the unrepeated CDMA pilot signal to the repeated CDMA pilot signal.

27. Computer readable media embodying a program of instructions executable by a computer program to perform a method for mobile station position determination, the method comprising:

receiving a repeated CDMA pilot signal;

receiving a GNSS waveform signal generated by a non-satellite transmitter;

receiving a GNSS signal generated by a satellite transmitter;

using the GNSS waveform signal to determine repeater identification; and determining position of a mobile station using the repeated CDMA pilot signal and the GNSS signal.

28. The computer readable media of claim 27 wherein the method further comprising receiving an unrepeated CDMA pilot signal and convening the unrepeated CDMA pilot signal to the repeated CDMA pilot signal.

* * * * *